United States Patent
Imai

[11] 3,936,149
[45] Feb. 3, 1976

[54] NON-HOMOGENEOUS OBJECTIVE LENS HAVING AN APERTURE DIAPHRAGM

[75] Inventor: Toshihiro Imai, Fuchu, Japan

[73] Assignee: Olympus Optical Co., Ltd., Tokyo, Japan

[22] Filed: Oct. 2, 1974

[21] Appl. No.: 511,464

[30] Foreign Application Priority Data
Oct. 4, 1973   Japan.............................. 48-110960

[52] U.S. Cl....... 350/175 GN; 350/96 GN; 350/206
[51] Int. Cl.²............................................ G02B 3/00
[58] Field of Search......... 350/96 GN, 175 GN, 206

[56] References Cited
UNITED STATES PATENTS 3,655,259   4/1972   Miyauchi et al. .............. 350/96 GN
3,658,407   4/1972   Kitano et al. ................. 350/175 GN Primary Examiner—Paul A. Sacher
Attorney, Agent, or Firm—Haseltine, Lake & Waters

[57] ABSTRACT

A non-homogeneous objective lens having an aperture diaphragm is disclosed which can effectively obviate flare without giving any bad influence upon the field and which can improve picture image quality. The aperture diaphragm gives illumination which is sufficient to satisfy a rear relay lens system and is arranged near a position which is distant and spaced apart from a projected image end surface of the objective lens by
$$(\tfrac{1}{4} + n)L$$
wherein $n$ is a positive integer inclusive of 0 and $L = 2\pi/\sqrt{2a}$,
and where $a$ is a proportional constant.

5 Claims, 4 Drawing Figures

FIG_1
PRIOR ART
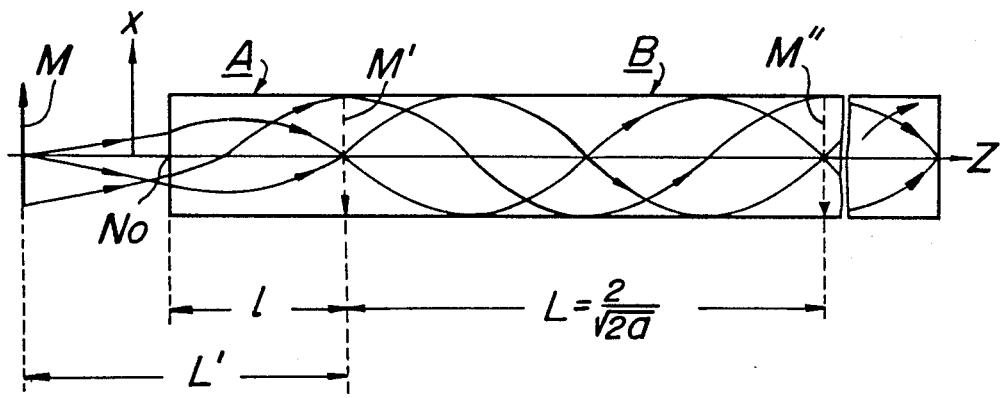
FIG_2
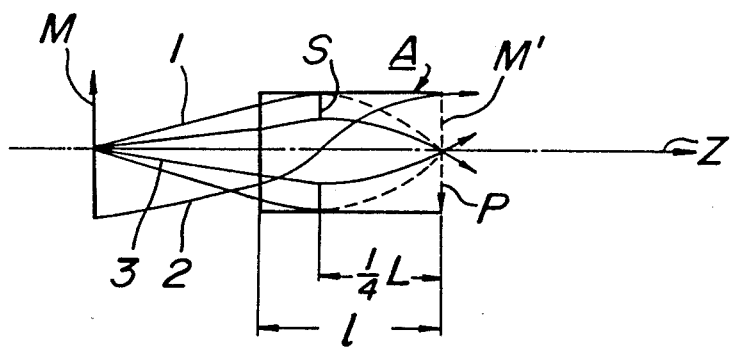

FIG_3
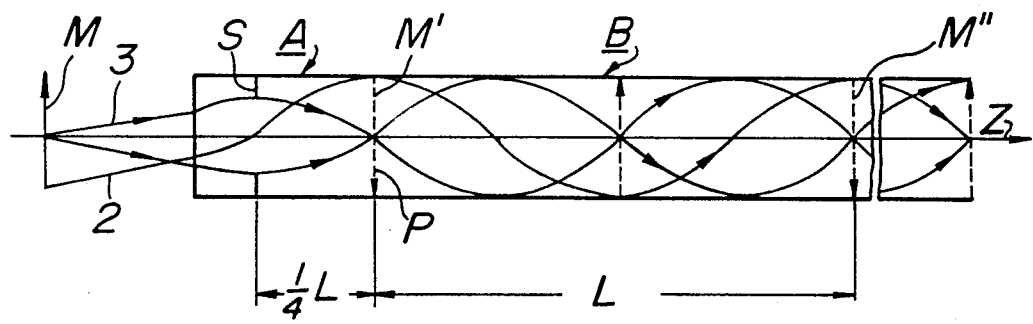
FIG_4
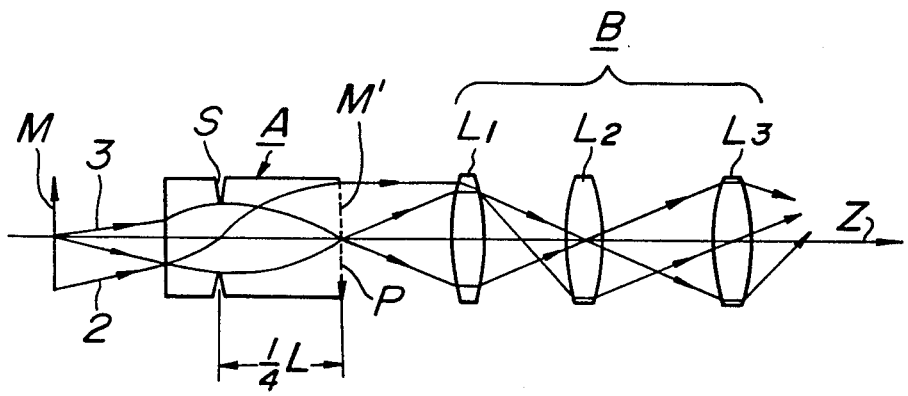

NON-HOMOGENEOUS OBJECTIVE LENS HAVING AN APERTURE DIAPHRAGM

This invention relates to small rod-shaped non-homogeneous light-focussing and conducting bodies and more particularly to a non-homogeneous objective lens having an aperture diaphragm and applicable to optical image transfer devices used to transmit image forming light from one location to another such, for example, as fiberscopes.

In the specification, the term non-homogeneous bodies shall be understood to mean bodies made of glasses, plastics and other lens materials whose refractive index varies in the radial direction from their optical axis to the outer periphery thereof.

In FIG. 1 of the accompanying drawings, to which full reference will be had somewhat later, is shown a prior art rod-shaped non-homogeneous body having a lens property. It has been well known that if a refractive index at a center optical axis Z is No and $a$ is a proportional constant, a refractive index $N(x)$ at a position radially distant from the optical axis Z by a radius $x$ is given by the following formula $$N(x) = No(1 - ax^2).$$

It has also been well known that if light is transmitted through the non-homogeneous body along its optical axis Z from left to right, as viewed in the drawing, that position of the light which is radially distant from the optical axis Z is given, in the case of paraxial light ray, by the following formula $$x = P\cos(\sqrt{2a}\, Z) + Q\sin(\sqrt{2a}\, Z)$$

where P and Q are constants.

In this case, its period L is given by
$$L = 2\pi/\sqrt{2a}.$$

An image of an object M is transferred to M', M'' ... in succession so as to reproduce a similar image.

In the case of using such kind of a non-homogeneous light focussing and conducting body as an optical system such as an optical image transfer device, it may be divided at a projected image end surface P into two lens elements A and B as shown in FIG. 1, and the front lens element A may be used as an objective lens, while the rear lens element B as a relay lens system. In this case, the above defined L is present in the rear relay lens system B and generally longer than a period L' of the objective lens A. As a result, a numerical aperture N.A. of the front objective lens A becomes larger than a numerical aperture N.A. of the rear relay lens system B, and hence the front objective lens A causes flare.

In order to obviate such flare, one could conceive to arrange a diaphragm in front of the front objective lens A. But, in this case, the diaphragm acts as the field diaphragm which makes a field narrow. It might also be conceived to arrange a diaphragm in the rear of the front objective lens A. In this case, the diaphragm can not obviate the flare.

An object of the invention, therefore, is to provide a non-homogeneous objective lens which can effectively obviate flare without giving any bad influence upon the field and which can improve picture image quality.

The invention will now be described in greater detail with reference to the accompanying drawings, wherein:

FIG. 1 is a diagrammatic view of a prior-art small rod-shaped non-homogeneous body having a lens property;

FIG. 2 is a diagrammatic view of one embodiment of the objective lens having an aperture diaphragm according to the invention;

FIG. 3 is a diagrammatic view of the objective lens shown in FIG. 2 as applied to an optical image transfer device; and FIG. 4 is a diagrammatic view of another embodiment of the objective lens as applied to another optical image transfer device.

FIG. 1, which illustrates a solution according to the prior art, has been described earlier.

In FIG. 2 is shown an objective lens A according to the invention. In the present embodiment, the length $l$ of the objective lens A along its center optical axis Z is selected as
$$l < 2\pi/\sqrt{2a} = L.$$

In FIG. 2, reference numeral 1 designates a light ray cone on axis which is incident on an objective lens A at its maximum numerical aperture N.A, when an aperture diaphragm S is absent, 2 a principal light ray cone out of axis which is emitted from the outer periphery of the object M toward a projected image end surface P of the objective lens A, and 3 a light ray cone on axis which is incident on the objective lens A at its maximum numerical aperture N.A, when the aperture diaphragm S is present.

In accordance with the invention, an aperture diaphragm S that limits the amount of light incident upon a rear relay lens system B and maintains illumination that is sufficient to satisfy the projected image M' is inserted near a position which is distant from the projected image end surface P of the objective lens A by $(\frac{1}{4} + n)L$ in $-Z$ direction. In $(\frac{1}{4} + n)L$, $n$ is a positive integer inclusive of 0, and L is the period defined by $2\pi/\sqrt{2a}$.

In the embodiment shown in FIG. 2, $n=0$ and the distance of the aperture diaphragm S from the projected image end surface P is $\frac{1}{4} L$. In this position, the light rays travelling through the objective lens A become substantially parallel with the optical axis Z. The light ray on axis 1 incident upon the overall surface of the aperture diaphragm S is shaded by it and changed into a light ray shown by the reference numeral 3, while the principal light ray 2 out of axis is not shaded by the aperture diaphragm S. As a result, the aperture diaphragm S is capable of not shading the field, but of shading the light ray emitted from out of field. Thus, the aperture diaphragm S can limit the amount of light incident upon the projected image and maintain sufficient illumination at the projected image, thereby obviating defective flare.

If the length $l$ of the objective lens A is $l < \frac{1}{4} L$, the aperture diaphragm S is positioned in front of the objective lens A. Even in such a case, if the aperture diaphragm S is arranged at a position which is spaced apart from the projected image end face P by $\frac{1}{4} L$, the objective lens A can limit the amount of light incident upon the projected image M' and maintain sufficient illumination at the projected image M' without shading the field.

In FIG. 3 is shown one embodiment of the objective lens according to the invention as applied to an optical image transfer device. In this embodiment, that part of a rod-shaped objective lens A which is distant from the projected image end surface P by $\frac{1}{4} L$ is divided into two lens elements. One of the opposed end surfaces of the two lens elements thus divided is subjected to a photo-etching process to form an annular diaphragm along the outer periphery thereof. Then, these divided portions are joined together to reproduce the original rod-shaped objective lens A with an annular aperture diaphragm S sandwiched between the divided elements as shown in FIG. 3.

In the embodiment shown in FIG. 3, a separate non-homogeneous relay lens system B can be connected to the rear of the objective lens A, with the aperture diaphragm S inserted therein, through which system the projected image M' is transmitted along the optical axis Z to any desired location.

In FIG. 4 is shown another embodiment of the objective lens according to the invention in which that part of the rod-shaped objective lens A which is distant from the projected image end surface P by ¼ L is subjected to a mechanical abrasion treatment to form a V-shaped groove along the outer periphery thereof, which is used as an aperture diaphragm S as shown in FIG. 4. In the present embodiment, use is made of a relay lens system B composed of a plurality of lenses, for example, a front relay lens $L_1$, a field lens $L_2$ and a rear relay lens $L_3$.

In this embodiment, the aperture diaphragm S can also limit the amount of light incident upon the rear relay lens system B and maintain sufficient illumination at the projected image without shading the field, thereby obviating defective flare.

In the above described inventive embodiments, the aperture diaphragm S is inserted near that portion of the objective lens A which is distant or spaced apart from the projected image end surface P by ¼ L which is given when $n=0$ in the formula $(¼ + n)L$.

Alternatively, n may be made larger than 0 in correspondence with the length $l$ of the objective lens A which is made longer than that used in the above described embodiments.

As stated hereinbefore, the invention provides a simple and economical way of arranging an aperture diaphragm at a given position with respect to an objective lens and further provides the important advantage that flare is obviated without limiting the light ray out of axis and hence without subjecting the field to bad influence thereby obtaining a good picture image.

What I claim is:

1. A non-homogeneous objective lens comprising a small rod-shaped non-homogeneous light focussing and conducting body whose refractive index N(x) at a position radially spaced apart from an optical axis by a radius x is given by $$N(x) = No(1 - ax^2)$$

where No is a refractive index at the optical axis and $a$ is a proportional constant, and a diaphragm for giving illumination which is sufficient to satisfy a rear relay lens system and arranged near a position which is spaced apart from a projected image end surface of the objective lens by $$(¼ + n)L$$

where $n$ is a positive integer inclusive of O and $$L = \frac{2\pi}{\sqrt{2a}}.$$

2. The non-homogeneous objective lens as claimed in claim 1, wherein said diaphragm is composed of an annular diaphragm formed circumferentially around the objective lens by photo-etching at that part of the lens which is arranged at said defined position.

3. The non-homogeneous objective lens as claimed in claim 1, wherein said diaphragm is composed of an annular diaphragm formed circumferentially around the objective lens by mechanical abrasion treatment at that part of the lens which is arranged at spaced-apart position.

4. The non-homogeneous objective lens as claimed in claim 1, wherein said diaphragm is constituted by a front lens element of a small rod-shaped light focussing and conducting body, the remainder element of said body constituting a rear relay lens element.

5. The non-homogeneous objective lens as claimed in claim 1, further comprising a separate non-homogeneous relay lens system composed of a plurality of lenses and arranged in the rear of the objective lens.

* * * * *